United States Patent [19]

Holtey et al.

[11] 3,815,103

[45] June 4, 1974

[54] MEMORY PRESENCE CHECKING APPARATUS

[75] Inventors: Thomas O. Holtey, Newton; Lallubhai O. Patel, Stoneham, both of Mass.

[73] Assignee: Honeywell Information Systems Inc., Waltham, Mass.

[22] Filed: Jan. 2, 1973

[21] Appl. No.: 320,212

[52] U.S. Cl. .............................. 340/172.5, 235/153

[51] Int. Cl. .............................. G06f 11/00

[58] Field of Search .................. 340/172.5; 235/153

[56] References Cited

UNITED STATES PATENTS

| | | | |
|---|---|---|---|
| 3,049,692 | 8/1962 | Hunt | 235/153 AM |
| 3,193,800 | 7/1965 | Shoultes | 235/153 AM |
| 3,270,318 | 8/1966 | Strawbridge | 235/153 AM |
| 3,517,171 | 6/1970 | Avizienis | 235/153 AK |
| 3,609,704 | 9/1971 | Schurter | 340/172.5 |
| 3,633,175 | 1/1972 | Harper | 340/172.5 |

*Primary Examiner*—Raulfe B. Zache
*Assistant Examiner*—Mark Edward Nusbaum
*Attorney, Agent, or Firm*—Faith F. Driscoll; Ronald T. Reiling

[57] ABSTRACT

Each storage section of a memory system of a microprogrammed remote terminal system includes checking apparatus coupled to the memory read circuits of the section. The checking apparatus of each section is linked electrically to another section when that section is installed in the system. When a memory location of the memory is addressed, the terminal system generates a read command signal. Checking circuits respond by returning a control signal which sets a storage device enabling the terminal system to detect when an attempt was made to access a nonexistent storage location. When such attempt occurs, the checking apparatus inhibits the return or echoing of the control signal thereby inhibiting the setting of the storage device. The terminal system after each memory cycle tests the state of the storage device and then inhibits parity check circuits from causing the signalling of a nonexistent memory error when access has been made to an installed memory location. When an attempt is made to access of an uninstalled memory storage location, the parity checking circuits produce an error signal used for signalling the terminal system of such access.

27 Claims, 10 Drawing Figures

MEMORY PRESENCE CHECKING APPARATUS

FIELD OF INVENTION

This invention relates to memory checking apparatus and more particularly to apparatus for detecting memory addressing errors caused by addressing nonexistent or uninstalled storage locations.

PRIOR ART

Many prior art data processing systems provide apparatus for detecting whenever an attempt is made to gain access to a nonexistent storage location in a given memory system. The apparatus generally takes the form of comparison circuits which are operative to compare an address presented to the memory system with a maximum address stored either in an auxiliary register or by a set of switches. When the address either equals or exceeds the stored maximum address, an error signal is generated which signals the attempted illegal access to the memory system. U.S. Pat. No. 3,413,613 illustrates an arrangement of the type described for detecting attempts to access protected areas and nonexistent areas. Arrangements of this type involve a considerable amount of apparatus.

In prior art systems, generally an operator along with loading the programs also informs the operating system of the maximum amount of memory available for running the programs. Further, once the maximum value for the memory system is established, it is not modified unless under the control of the operating system software. Therefore, when changes are made in the amount of memory in a system either during installation or as a consequence of repairs by maintenance personnel, the operating system can prevent error signals from being generated incorrectly by changing the maximum value.

The above is not possible in small installation sites which include only a terminal system which has no operating system to permit the automatic tailoring of programs to be run by the system. Also, it may not be practical to have an operator initiate such changes unless the operator is highly skilled and skilled operators are not normally available at remote sites.

Also, in many instances, the amount of memory space must be ascertained in order to guarantee that a particular program, such as a sort program, can be run efficiently at a remote site. Since the target system at a remote site has no operating system, the host system located at a central site is unable to send a message via a communications link to the operator at the target system at the remote site requesting an indication as to amount of memory available.

Accordingly, it is an object of the present invention to provide apparatus for detecting accesses to nonexistent storage locations of a memory system.

It is another object of the present invention to provide apparatus for automatically determining the amount of memory available in a system without requiring the invoking of an operating system.

SUMMARY OF THE INVENTION

These objects are accomplished in a preferred embodiment of the present invention wherein each storage section of the memory system of a microprogrammed remote terminal system includes checking apparatus coupled to the memory read circuits of the section. The checking apparatus of each section is automatically linked electrically to another section when its memory section is installed in the system. When a memory location of the memory system is addressed, the terminal system generates a read command signal. The checking circuits of the memory system respond by returning a control signal which sets a storage device enabling the terminal system to detect whether an attempt was made to access a nonexistent storage location. When an uninstalled or nonexistent memory section is addressed, the checking apparatus of the section inhibits the return or echoing of the control signal thereby inhibiting the switching of the storage device. After each memory cycle, the terminal system under microinstruction control tests the state of the storage device and then inhibits the parity check circuits from causing the signalling of a nonexistent memory error when access has been made to an installed memory location. When access an attempt is made to an uninstalled memory storage location, the parity circuits produce an error signal (e.g., odd parity is used) which is used for signalling the attempt to the terminal system.

A diagnostic routine resident in the control store of the terminal system is used in combination with the checking arrangement of the invention to establish the upper limit or upper boundary of memory available in the system. The diagnostic routine initiates the sequential addressing of the storage locations of the main memory system until a parity error signal is produced by addressing a storage location of an uninstalled memory section. That is, first, it forces an all zero address into the main memory address register. It then successively increments by one, the address contents of the register until parity error signal is detected. The diagnostic routine causes a bit representation of the maximum address stored in the address registers to be written into a predetermined scratch pad storage location of the main memory for subsequent program reference.

The terminal system under microprogram control can also reference the contents of a scratchpad location when performing both on-line and off-line operations. For example, during on-line operations as either part of a standard communications control procedure or in response to a command transmitted by the host system, the terminal system is operative to reference the contents of the scratchpad location and transmit to a requesting processing system a bit representation of these contents indicating the maximum memory address the system has available. When transmitted during a control procedure, the terminal system includes the maximum address information as a part of the normal communication message. The requesting processing system upon determining that the amount of memory is sufficient for running a particular program can then load the program into the system.

During off-line operations, the terminal system can also reference the same stored maximum address information as part of its start up procedure after the terminal system has been loaded with a program. The system is then operative to use the maximum address information to determine the number of buffers and the size of buffers required for running the program with the amount of memory available. Thus, the invention provides means for allowing either a host system at a remote site or the terminal system itself to determine quickly and efficiently the amount of memory space it has available. Further, the determination is able to be made without having to rely on an unskilled operator.

The above and other objects of this invention are achieved in a preferred embodiment described hereinafter. The novel features which are believed to be characteristic of the invention both as to its organization and to its method of operation, together with further objects and advantages thereof will be better understood from the following description considered in connection with the accompanying drawings. It is to be expressly understood, however, that these drawings are for the purpose of illustration and description only and are not intended as a definition of the limits of the present invention.

DESCRIPTION OF THE PREFERRED EMBODIMENT

Figure 1:
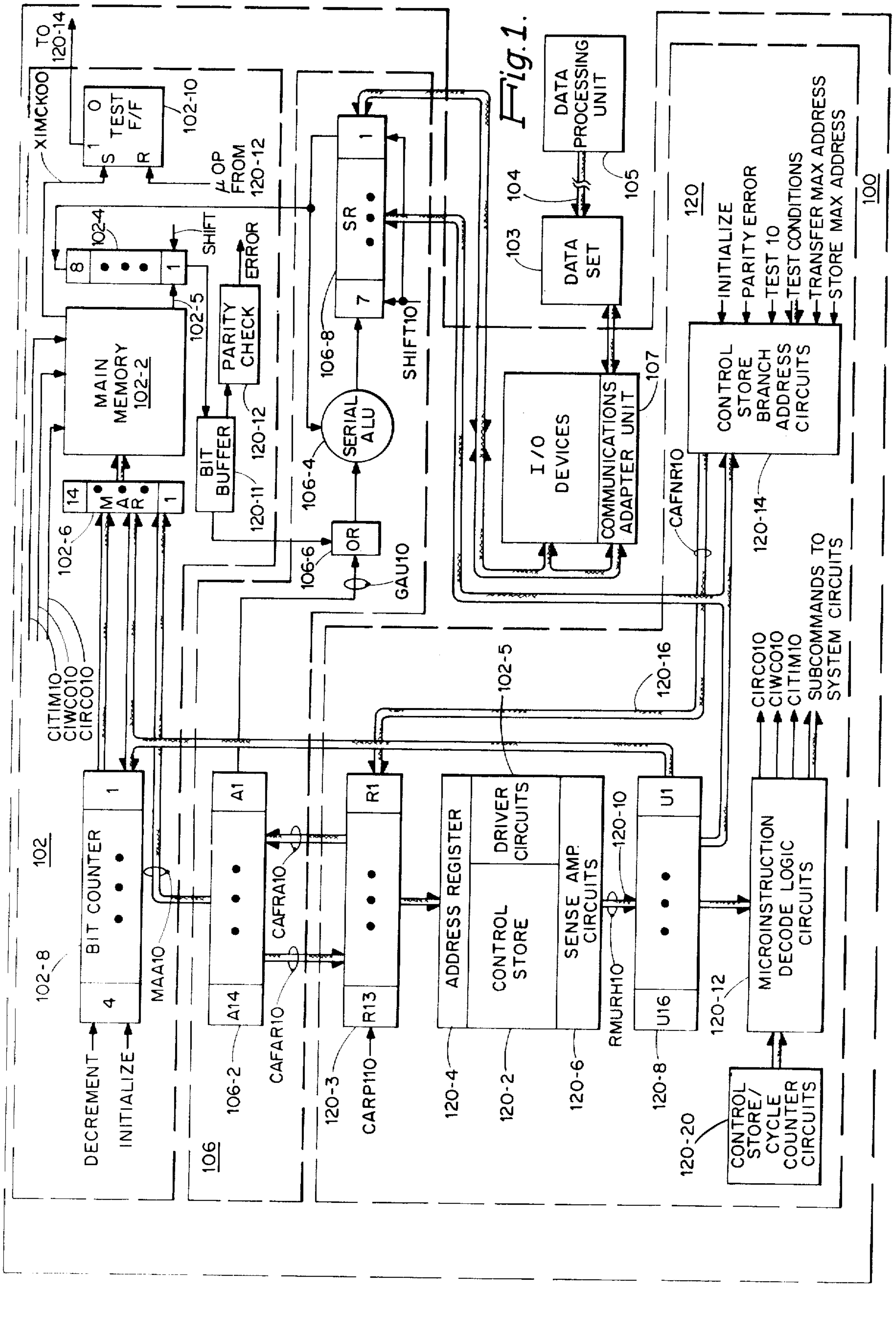
FIG. 1 is a block diagram of a remote terminal system incorporating the present invention.

First, reference is made to FIG. 1. This figure shows in block diagram form a microprogrammed terminal system 100 arranged to perform local data processing and arranged to be operated on-line via a conventional data set or modem 103 and a communications channel 104 to a host system located at a central site 105. The terminal system 100 includes a main memory section 102, a control section 120 and a processing section 106.

The main memory section 102 includes a serial access, byte oriented core memory 102-2, conventional in design, which provides storage for user programs and data. Additionally, the main memory 102-2 provides working storage in a scratchpad area 102-4 for both user programs and system microprograms.

The main memory system includes a number of magnetic core planes arranged in a 2½D organization, as described in further detail herein. The system is expandable in increments of 1K bytes (1,024 bytes) of storage locations and has a maximum capacity of 16K bytes (16,384 bytes) of storage which are housed in four separate modules.

The main memory section 102 also includes a memory address register 102-6 arranged to receive a portion (i.e., byte address) of a 14 bit address from either the processing section 106 or the control section 120. The remaining portion (i.e., bit address) of the 14 bit address is provided by a four stage bit counter 102-8. With the fourteen bit address, the memory address register 102-6 is able to specify any bit of any one of 16K memory bytes of information.

At the start of each read/write cycle of operation, the contents of the bit counter 102-8 are forced to a low order bit address (e.g., 111 which corresponds to the address of bit 1). During each subsequent access cycle, the contents of the bit counter are decremented by one and a different bit of each byte location is addressed and read out into the first stage of an input/output register 102-4 via line 102-15. The register contents are then shifted by one. The bit read out into register 102-4 is then either restored to the same location (i.e., during read/restore cycle) or modified and then written back into the same location (i.e., during a clear/write cycle). An indication of the bit is also stored in a bit buffer 102-11 and this is applied to a parity check circuit 102-12. The parity check circuit, conventional in design, sums module 2, each bit of a byte to produce an odd parity check bit which is compared with the parity bit of the byte upon completing the read out of a complete byte as signalled by the bit counter 102-8 having been decremented to an all ZERO count. Lastly, section 102 includes a test flip-flop 102-10 arranged to be reset via a micro-subcommand signal from decode circuits 120-12 and arranged to be set via signal X1MCK10.

As mentioned above, the processing section 106 provides byte address information and this information is obtained from an auxiliary register 106-2, designated as the A register. The A register serves as a working register and couples to a serial arithmetic-logic unit (ALU) 106-4 via an OR gate 106-4 which provides a path for transfer of its contents to ALU 106-4 for either processing or for storage in main memory. Also, the A register 106-2 is arranged to exchange address information with an address register included within control section 120 in response to a pair of subcommand signals CAFRA10 and CAFAR10.

Additionally, the processing section 106 includes a seven stage input/output shift register 106-8. The register 106-8 is used for several functions which include serving as a read/write buffer for main memory and input/output transfers, storing operands and results for the serial ALU 106-4 and source/designation register for most internal register transfers. The register 106-8 communicates with the buffer registers (not shown) included within each of the input/output devices and the communication adapter unit 107 of the system for transfers in response to subcommand signals generated by the control section 120 of FIG. 1.

The control section 120 provides subcommand signals for controlling the operation of system 100. More specifically, processing performed by section 106, input/output transfer operations between input/output devices and the system, and communication functions are directly controlled by microprograms stored in a control store 120-2 of section 120.

These routines include system routines used to check system status before initiating the fetching and the execution of user program software instructions stored in main memory. The control store routines also include diagnostic and maintenance routines for verifying the operation of the control section and other sections of the system.

An extract routine is used to retrieve the starting address stored in a sequence counter storage location from main memory and then causes fetching of the entire instruction which normally includes an op code, A address, B address and parameters. The various portions of the instruction are stored in predetermined locations of main memory scratchpad 102-4. The control store 120-2 further includes an op code table which is addressed by the previously stored op code when the entire instruction has been fetched. The table includes a series of 64 branch microinstructions, one for each type of op code which includes the starting address in the control store of the instruction routine used to execute the operation specified. Each of the instruction routines is used to execute a single user instruction using parameters stored in main memory 102-2. After completing execution, the instruction routine returns control to the system routines. Also, certain error conditions detected during instruction fetching and execution will cause a return of control to the system routines.

The control store 120-2 is conventional in design and is addressed via a twelve stage address register 120-4 arranged to have its contents incremented via an auxiliary register 120-3 in response to a subcommand signal CARP110. The auxiliary register 120-3 provides temporary storage for a current address when the control store is being loaded with new information either panel switches or buffer registers (not shown). A control store clock 120-20, conventional in design, generates signals for cycling the control store 120-2 and for establishing the timing for the remainder of the system.

During a read cycle, the contents of an addressed location are read into an input/output register 120-8 via the sense amplifier circuits 120-6 and a bus 120-10 in response to a subcommand signal RMURH10. During the read cycle of operation, the contents of the addressed storage location are checked for correct parity.

After the completion of the read cycle, the microinstruction word stored in register 120-8 is decoded by a group of microinstruction decode logic circuits included within a block 120-12. The circuits of block 120-12 in turn generate subcommand signals which are applied to the rest of the system to carry out the execution of the microinstruction. During microinstruction execution, the contents of the register 120-8 are written back into the addressed location via driver circuits 120-5. Following the execution of the microinstruction, the contents of the memory address register 120-4 are incremented by one and are then used to select the address of the next microinstruction to be read and executed.

Normally, microinstructions are read and executed in sequence until either a skip or a branch microinstruction is decoded. When a skip microinstruction is decoded, it causes the contents of the memory address register 120-4 to be incremented twice during the execution cycle. When a branch instruction is executed, it causes control store address/diagnostic circuits included within a block 120-14 via a bus 120-16 in response to a subcommand signal CAFNR10.

Other types of branch microinstructions cause the generation of the subcommand signal CAFRA10 which causes the address information in the register 120-8 to be stored in the A register 106-2 of the processing section 106. For further information as to the microinstruction word formats, reference may be made to the copending patent application of Donald G. Greenwald and Thomas O. Holtey, titled "Automatic Diagnostic Routine for Verifying the Operation of a Control Store," Ser. No. 320,048 filed on even date herewith A communication adapter 107 and data set 103 provide an interface with the host system to the communications line or channel 104. The adapter unit 107 data set are both conventional in design. The adapter unit 107 includes decoder circuits operative to decode messages from the host system transmitted to the terminal system 100 over the communications channel 104. One such message can form part of a communication control procedure such as a handshaking procedure, or constitute a message requesting for an indication of the maximum available memory in the system. In response to this type of message, the communications adapter unit 107 is operative to cause the generation of a TRANSFER MAX ADDRESS signal which is applied to the control store branch address circuits 120-14. This causes the control store 120-2 to branch to a starting storage location of a microinstruction routine which results in the transmission of the maximum address information as explained herein.

Figure 1A:
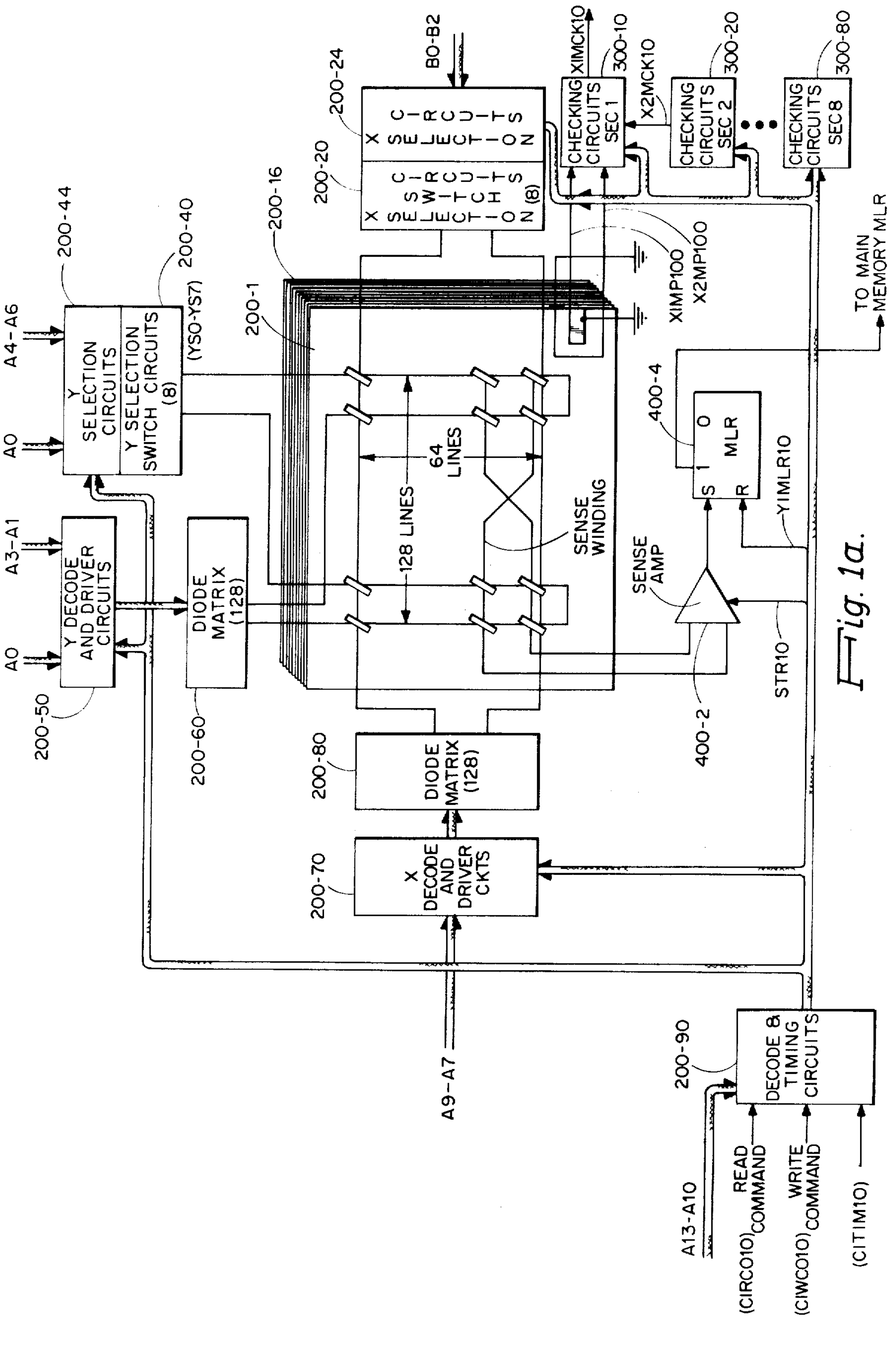
FIG. 1*a* shows in block form the main memory system of FIG. 1.
Figure 1B:
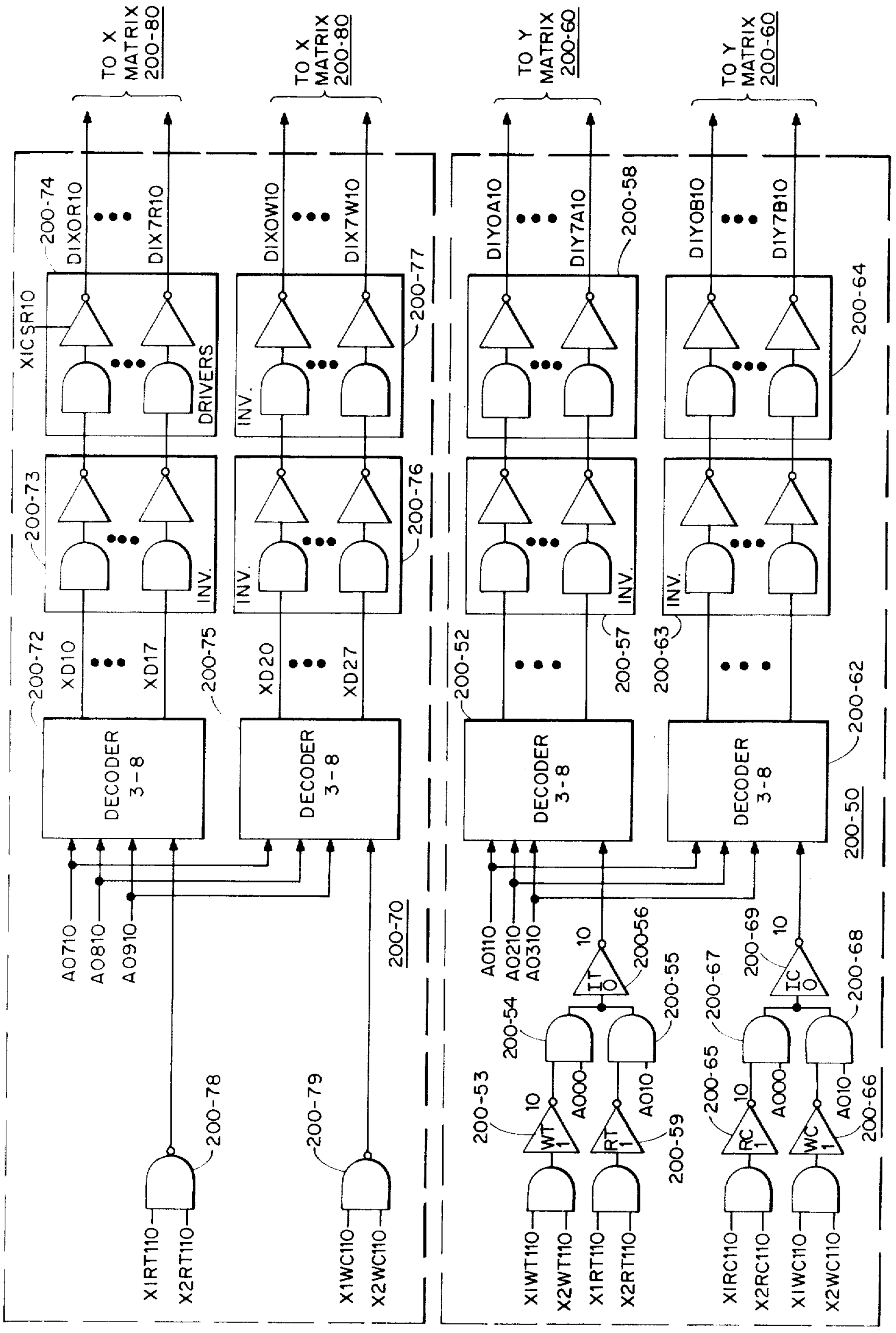
FIG. 1*b* shows in greater detail the X and Y driver circuits of one section of the memory system of FIG. 1*a*.

FIG. 1a illustrates in greater detail the organization of the main memory 102-2 of FIG. 1. As shown, the memory includes a plurality of memory planes 200-1 through 200-16 organized as a conventional 2½D, 3 wire, coincident current system. Each 1K section of memory includes a plurality of X select switching circuits 200-20 and associated decoding circuits 200-24 shown in FIG. 1*d*, Y select switching circuits 200-40 and associated Y decoding circuits 200-44 of FIG. 1*c*. The system also includes a plurality of X driver circuits 200-70 and Y driver circuits 200-50 arranged to supply signals to diode matrices 200-80 and 200-60 respectively in response having decoded different combinations of memory address signals. The X and Y driver circuits associated decoding circuits are shown in FIG. 1*b*.

Each section further includes timing circuits 200-90 which generate the appropriate signals for synchronizing memory read and write operations with the remainder of the terminal system 100 as explained in greater detail herein. Also, the timing section generates the appropriate strobe timing signals for read out into a sense amplifier circuit 400-2 of the binary 1 and binary 0 contents of an addressed bit location. A bit buffer stage 400-4 is conditioned by a timing signal to store an indication of the contents served by the amplifier circuit 400-2.

FIG. 1*a* also includes a plurality of checking circuits 300-10 through 300-160 for memory sections 1 through 16 respectively. These circuits are shown in detail in FIG. 2*a*.

Figure 1C:
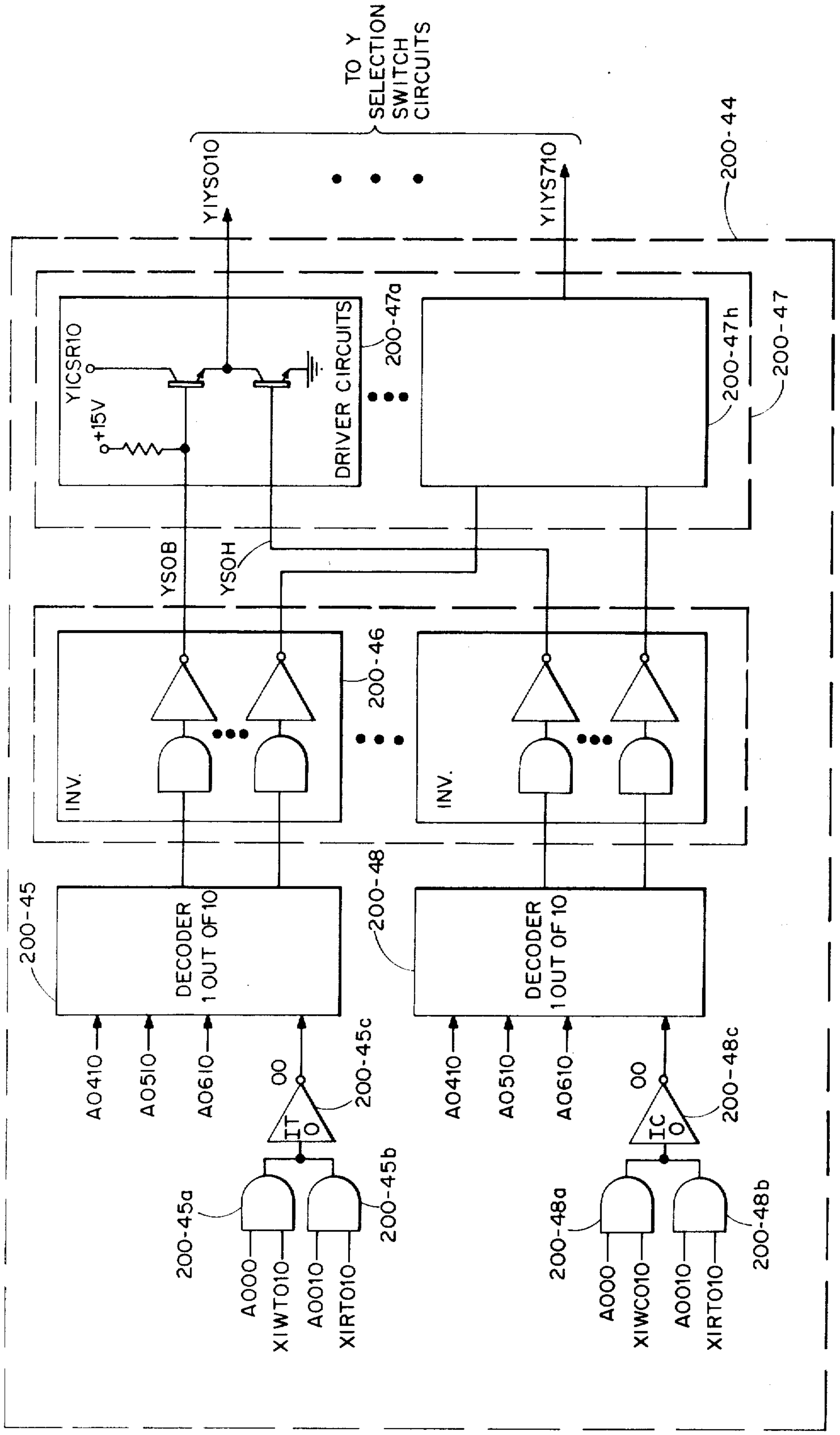
FIG. 1*c* shows in greater detail the Y selection circuits of one section of the memory system of FIG. 1*a*.
Figure 1D:
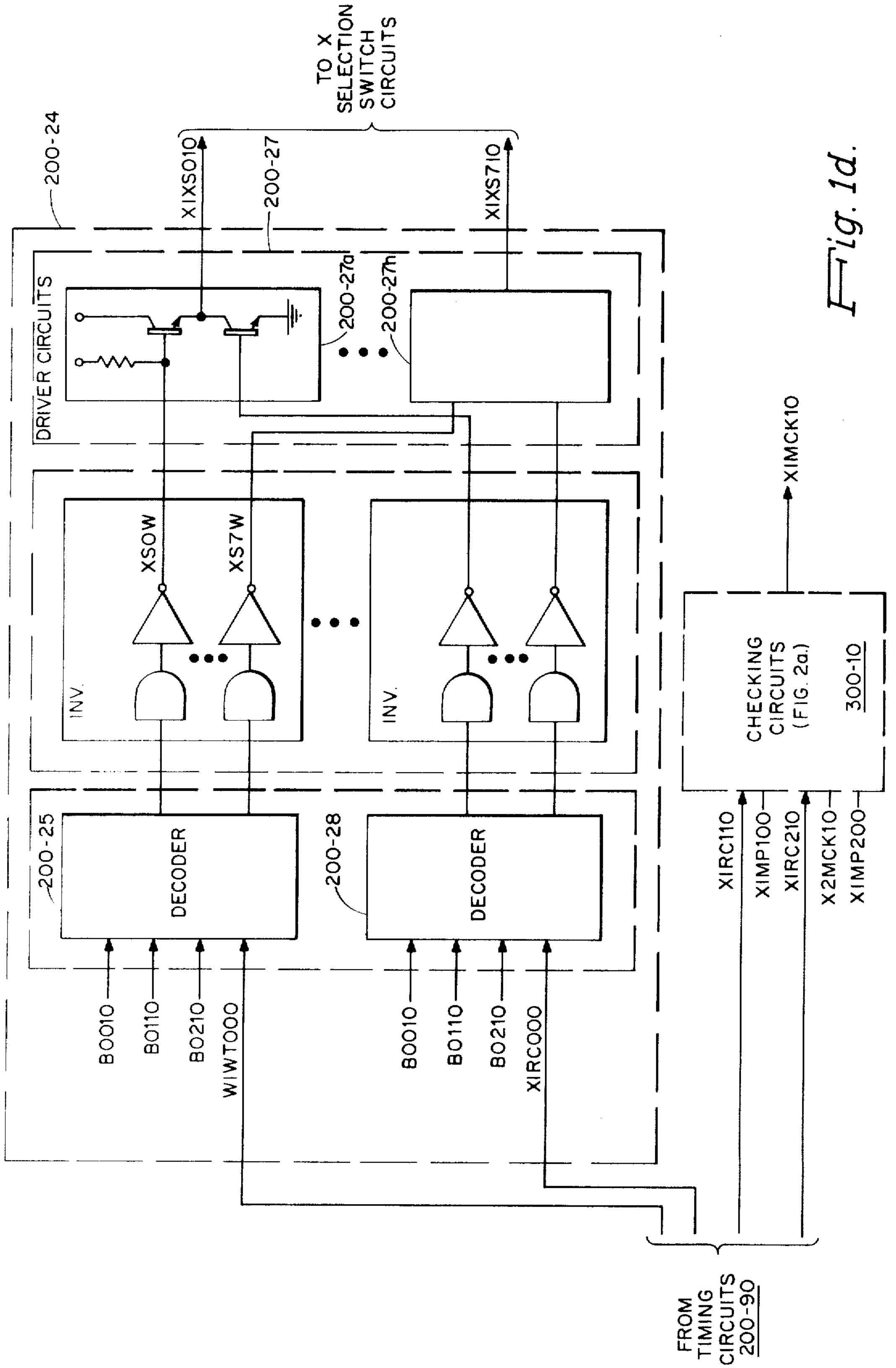
FIG. 1*d* shows in greater detail the X selection circuits of one section of the memory system of FIG. 1*a* and in block form the decode and checking circuits of one section.
Figure 1E:
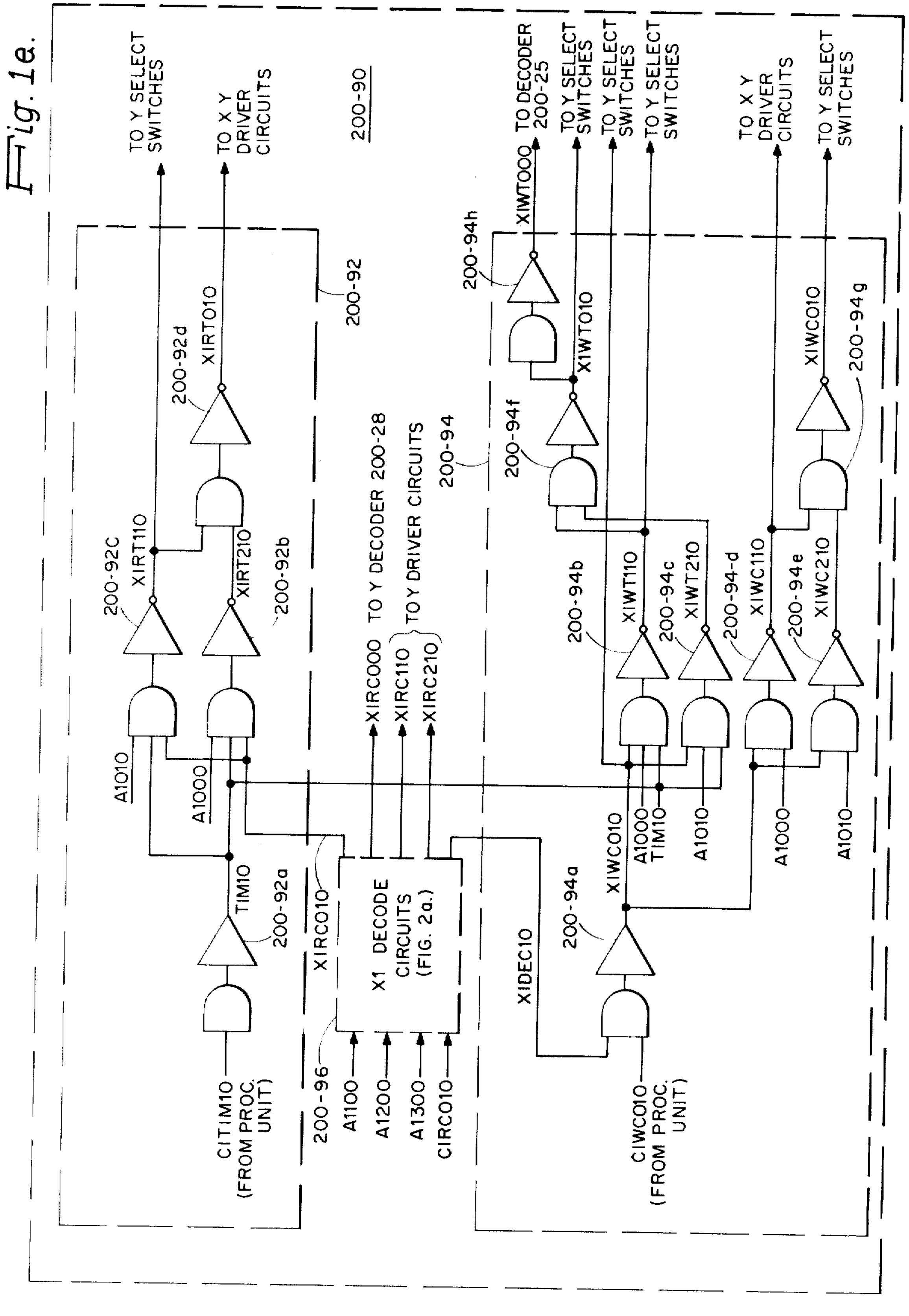
FIG. 1*e* shows in greater detail the timing circuits 200-90 of FIG. 1.
Figure 1F:
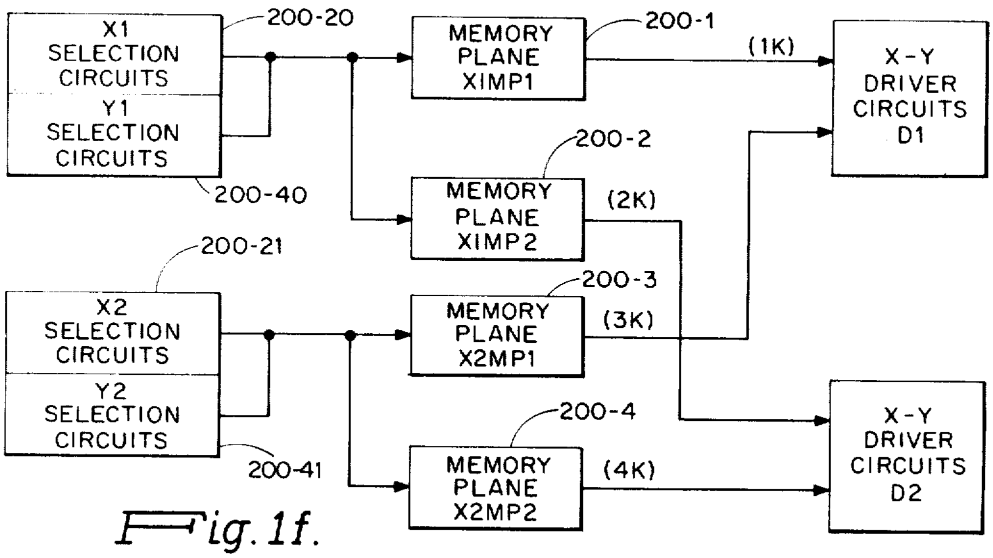
FIG. 1*f* shows in block diagram form an arrangement for sharing the X and Y driver circuits and selection circuits of FIG. 1*a*.
Figure 2B:
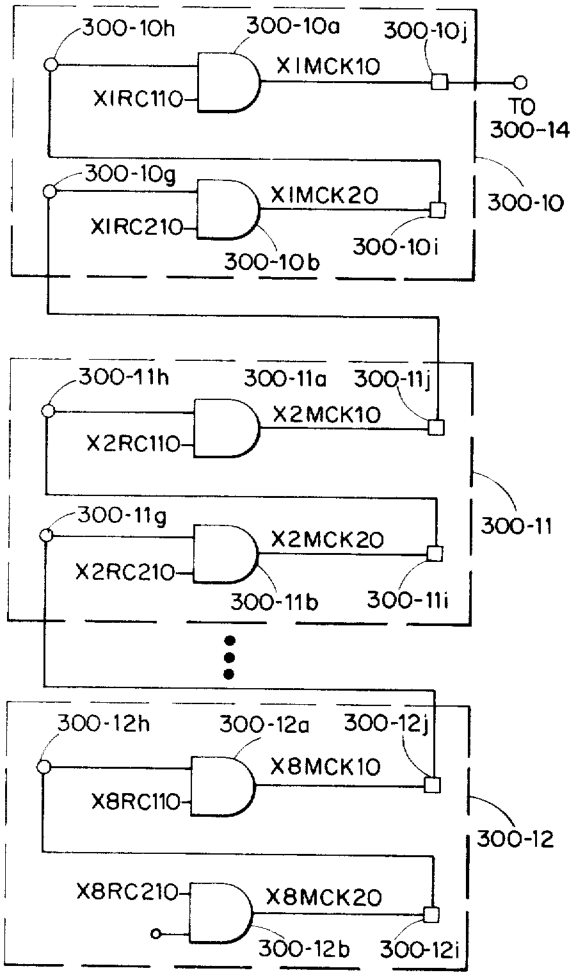
FIGS. 2*b* and 2*c* show alternate embodiments of the checking circuits for the memory system of FIG. 1*a*.
Figure 2C:
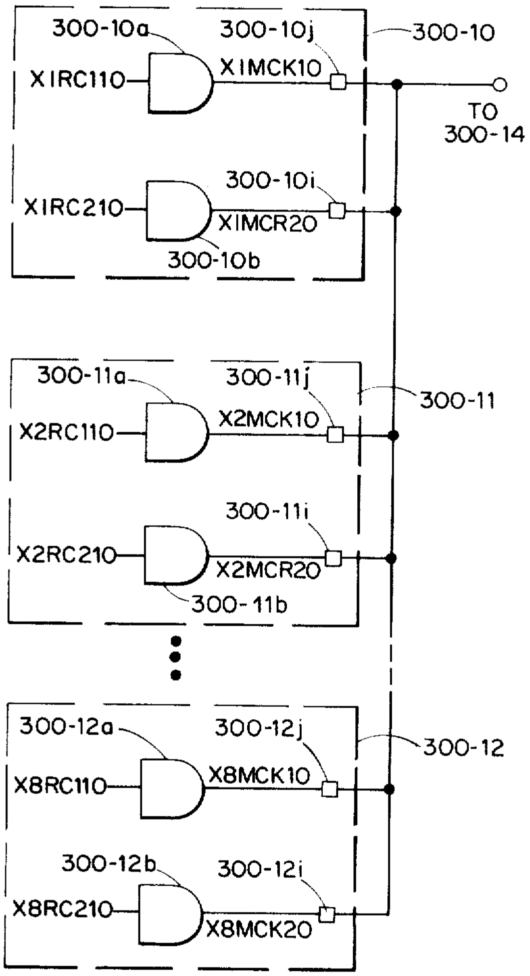

In a preferred embodiment of the invention, the X and Y selection circuits together with the X and Y driver circuits are arranged to be shared by pairs of memory planes as illustrated by FIG. 1*f*. For example, in FIG. 1f, different sets of selection circuits and driver circuits are arranged to serve planes X1MP1, X1MP2 and X1MP2, X2MP2. The selection of the memory planes and sets of circuits used for each plane are as indicated by the following table.

| ADDRESS CODE A13 | A12 | A11 | X & Y SELECT SWITCH CIRCUITS | A10 | X-Y DRIVER CIRCUITS | MEMORY PLANE |
|---|---|---|---|---|---|---|
| 0 | 0 | 0 | X1, Y1 | 0 | D1 | X1MP1 |
| | | | | 1 | D2 | X1MP2 |
| 0 | 0 | 1 | X2, Y2 | 0 | D1 | X2MP1 |
| | | | | 1 | D2 | X2MP2 |
| 0 | 1 | 0 | X3, Y3 | 0 | D3 | X3MP1 |
| | | | | 1 | D4 | X3MP2 |
| 0 | 1 | 1 | X4, Y4 | 0 | D3 | X4MP1 |
| | | | | 1 | D4 | X4MP2 |
| 1 | 0 | 0 | X5, Y5 | 0 | D5 | X5MP1 |
| | | | | 1 | D6 | X5MP2 |
| 1 | 0 | 1 | X6, Y6 | 0 | D5 | X6MP1 |
| | | | | 1 | D6 | X6MP2 |
| 1 | 1 | 0 | X7, Y7 | 0 | D7 | X7MP1 |
| | | | | 1 | D8 | X7MP2 |
| 1 | 1 | 1 | X8, Y8 | 0 | D7 | X8MP1 |
| | | | | 1 | D8 | X8MP2 |

X AND Y DRIVER CIRCUITS

Before describing the apparatus of the present invention, the circuits of FIGS. 1*b*, 1*c*, 1*d* and 1*e* will be discussed. Referring to FIG. 1*b*, it is seen that the X driver circuits 200-70 and Y driver circuits 200-50 each are arranged to include a pair of decoder circuits whose output signals are inverted by a plurality of driver circuits. More specifically, the decoder circuits 200-72 decode the address bits A07 through A09 in response to timing signals X1RT110 and X2RT110 applied via a gate and inverter circuit 200-78 and produce eight separate output signals XD10 through XD17. These signals are inverted by the inverter circuits 200-73 and applied to the driver circuits 200-74 as shown. The driver output read signals D1XOR10 through D1X7R10 are in turn applied to the diode matrix 200-80 of FIG. 1*a*.

In a similar fashion, the decoder circuit 200-75 decodes address bits A07 through A09 in response to timing signals X1WC110 and X2WC110 from timing circuits 200-90 of FIG. 1*d* (i.e., signal X2WC110 is generated by circuits for memory plane X2 in the manner shown in FIG. 1*d*). The eight separate output signals XD20 through XD27 are inverted by inverter circuits 200-76 and then applied to inverter driver circuits 200-77. These circuits generate write driver signals D1X0W10 through D1X7W10 which are also applied to the diode matrix 200-80.

The Y driver circuits 200-50 are arranged identically to the X driver circuits 200-70. The decoder circuits 200-52 and 200-62 decode the address bits A01 through A03 into sets of eight output signals in response to the signals from the timing circuits 200-40 of FIG. 1*d*. That is, the decoder circuit 200-52 generates an output signal in response to signal IT010 being forced to a binary 1 by an inverter circuit 200-56. The inverter circuit 200-56 responds to the pairs of signals X1WT110, X2WT110 and X1RT110, X2RT110 applied via AND gate and inverter circuits 200-53 and 200-59 and AND gates 200-54 and 200-55. Similarly, the decoder circuit 200-62 generates an output signal in response to signal IC010 being forced to a binary 1 by an inverter circuit 200-69. The pairs of signals X1WC110, W2WC110 and X1RC110, X2RC110 applied via AND gate and inverter circuits 200-66 and 200-65, AND gates 200-67 and 200-68 are arranged to condition the inverter circuit 200-69 appropriately.

The inverter circuits 200-57 and 200-63 invert the output signals from their decoder circuits and apply them to the driver circuits 200-58 and 200-64. The driver circuits 200-58 and 200-64 respectively apply output signals D1Y0A10 through D1Y7A10 and signals D1Y0B10 through D1Y7B10 to different input terminals of the matrix 200-60.

Y SELECTION CIRCUITS

FIG. 1*c* shows in greater detail, the Y selection circuits 200-44. The circuits include decoder circuits 200-45 and 200-48 each arranged to decode address bits A04 through A06 in response to timing signals from timing circuits 200-90 (signals X1WT010, X0RT010 and X1WC010 applied from AND gates 200-45*a*, 200-45*b*, 200-48*a*, and 200-48*b* and inverter circuits 200-45*c* and 200-48*c*). The eight output signals from each decoder circuit are inverted by the inverter circuits 200-46 and applied to the driver circuits 200-47*a* through 200-47*h* of block 200-47 as shown. The output signals Y1YS010 through Y1YS710 generated by the driver circuits 200-47 are applied to the Y selection circuits 200-40 of FIG. 1*a*.

X SELECTION CIRCUITS

FIG. 1*d* shows in greater detail the X selection circuits 200-24. These circuits include decoder circuits 200-25 and 200-28, inverter circuits 200-26 and driver circuits 200-27*a* through 200-27*h* arranged as shown. Each of the decoder circuits 200-25 and 200-28 decode the bit counter bits B00 through B02 in response to command signals X1WT000 and X1RC000 applied from the timing circuits 200-90 of FIG. 1*e*. This results in the driver circuits 200-27 producing output signals X1XS010 through X1XS710 which are applied to the selection switch circuits 200-20 of FIG. 1*a*. The read command signals X1RC110 and X1RC210 generated by circuits 200-90 are also applied to the checking circuits 200-10 of FIG. 2*a* as shown.

TIMING CIRCUITS

FIG. 1*e* shows the circuits which generate in response to externally applied signals C1T1M10, C1RC010, and C1WC010 the appropriate timing and control signals for writing and reading information into and from address storage locations. The signals for reading information from addressed storage locations are generated by the decode circuits 200-96 of FIG. 2a in response to a read command signal C1RC010 in the manner described herein with reference to FIG. 2*a*. The write command signals X1WT000, X1WT010, X1WT210, X1WC110, X1WC010 and X1WC210 are generated in response to the write command signal C1WC101 by the logic circuits of block 200-94. These circuits include an AND gate 200-94*a*, an inverter circuit 200-94*h* and AND gate and inverter circuits 200-94*b* through 200-94*g* arranged as shown.

The other timing signals X1RT010, X1RT110 and X1RT210 are generated in response to the timing signal C1T1M10 by the circuits of block 200-92. These circuits include a gate and amplifier circuit 200-92*a* and AND gate and inverter circuits 200-92*b* through 200-92*d* arranged as shown.

CHECKING CIRCUITS

Figure 2A:
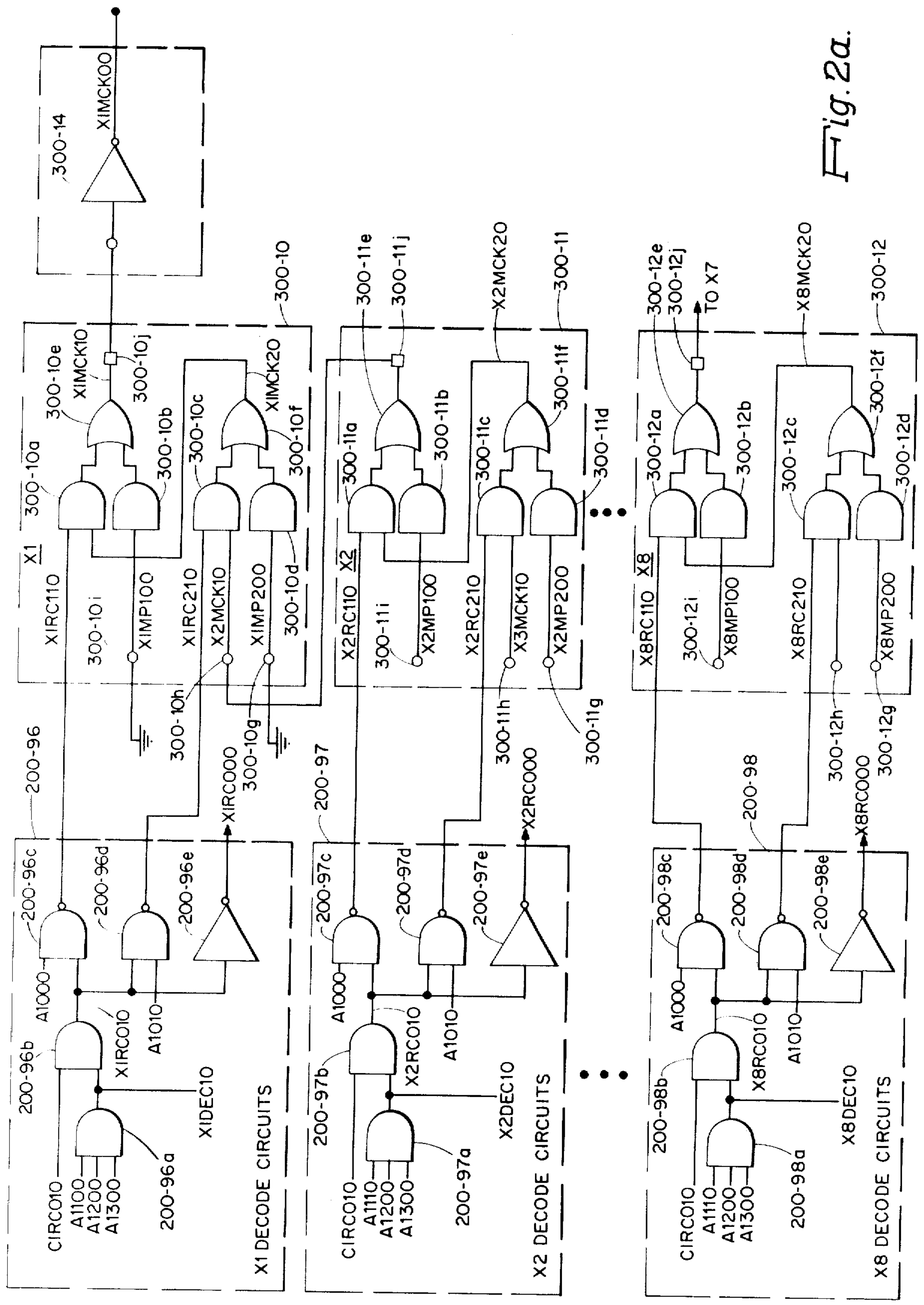
FIG. 2*a* shows in greater detail the selection circuits and checking circuits for the memory system of FIG. 1*a*.

In accordance with the present invention, each of the pairs of memory planes X1 through X8 of the memory system of FIG. 1*a* has checking circuits 300-10, 300-11 and 300-12 of FIG. 2*a* associated therewith. Each of the eight pairs of checking circuits are identical in construction and differ only in the sources of the input signals applied.

As seen from the Figure, each of the circuits includes a plurality of AND gates (e.g., gates **300-10*a* through 300-10*d*) and OR gates (e.g. gates 300-10*e* and 300-10*f*) arranged as shown. The read command signals for each pair are generated by the decode circuits associated therewith. For example, the signals X1RC110 and X1RC210 are generated by the decoding circuits 200-96 for the pair of planes X1MP1 and X1MP2. The decoding circuits 200-97 and 200-98 supply similar signals for planes X2MP1, X2MP1 and X8MP1, X8MP1**, respectively.

As seen from FIG. 2*a*, each of the decoding circuits include a plurality of AND gates (e.g., gates **200-96*a* and 200-96*b*), NAND gates (e.g., gates 200-96*c* and 200-96*d*) and inverter circuits (e.g., circuit 200-96*e*) arranged as shown. A first AND gate (e.g., 200-96*a*) is operative to select the appropriate pair of planes (e.g., X1MP1 and X1MP2) by decoding a particular combination of address bits A10 through A13. A second AND gate (e.g., 200-96*b*) combines the decoded output signal with the read command signal C1RC010 from the processing section 106 of FIG. 1 and produces a read command signal for the pair of planes. The pair of NAND gates of the circuits determines which one of the pair of planes is selected by decoding the state of address bit A10. When bit A10 is a binary 0, the first plane (e.g., X1MP1) of the pair is selected and when bit A10 is a binary 1, the second plane (e.g., X1MP2**) of the pair is selected.

The checking circuits of each pair are internally connected in series as shown. The pairs of checking circuits are externally connected in series through pin connections (e.g., pin **300-10*h* connects to 300-11*j***). The reasons for the external connection is in this embodiment each of the checking circuits serve a pair of memory planes and are included as part of the circuits for the pair.

Each of the pair circuits also receive one or more signals which indicate the presence of the memory planes. For example, when memory planes X1MP1 through X8MP2 are installed in the memory system, they force the signals X1MP100 through X8MP200 respectively to binary 0's.

In the embodiment of FIG. **2*a*, the memory presence signals are applied to the checking circuits when the planes are installed so as to connect the pins of the circuits to a ground or zero volts potential. When a plane has not been installed, the pin for the plane is not grounded (i.e., the input terminal floats) and the presence signal for that plane is forced to a binary 1 indicative of the fact that the plane is not present. When a memory storage location of a plane (e.g., plane X1MP2) is selected by the address bits A10 through A13, the decode circuits force the read selection signal (e.g., X1RC210) to a binary 0 which inhibits a response from checking circuits associated with planes assigned higher addresses. If that plane and planes assigned lower addresses are installed, then the read command signal X1MCK00 if forced to a binary 1 by inverter circuit 200-14. Accordingly, when all planes are present and a storage location within the plane having the highest or maximum address is addressed (i.e., plane X8MP2), the binary 0 signal originating at the selected plane passes or "ripples" through the checking circuits of each of the unselected planes and causes circuit 200-14 to force signal X1MCK00 to a binary 1. On the other hand, when plane X8MP2 is not present, it forces signal X8MCK20 to a binary 1. When the plane is selected, signal X8MCK20 still remains at a binary 1 and forces read signal X1MCK00** to a binary 0.

When some of the circuits, such as the plane decode circuits 200-96, 200-97 and 200-98 are constructed on different cards, both the decode circuits as well as the memory planes must be installed or the read signal X1MCK00 will be forced to a binary 0 (i.e., the plane select signal of the uninstalled decode circuits remains a binary 1).

FIG. **2*b* illustrates a second embodiment of the checking circuits of the present invention. The arrangement is such that all circuits of a memory plane are constructed on the same board. Each memory plane has an AND gate associated therewith (i.e., gates 200-10*a* through 300-12*a*). As shown, each of the checking circuits requires two pins, one to bring in a signal from a previous circuit and the other to send a signal out. The connections between the pins of different circuits is made by system wiring. The operation of the checking circuits is the same as those in FIG. 2*a***.

Where it becomes desirable to reduce the delays, a checking arrangement such as that illustrated by FIG. **2*c* can be used. Only one pin for each memory plane is required. In this arrangement, any memory plane not present will force the read command signal X1MCK00** to a binary 0. In all of the arrangements, checking logic circuits are associated with each memory plane and are operative to transmit a memory presence signal when its memory plane is installed. This is accomplished by providing an extra pin or connector on the plane which produces the memory presence signal only when the memory plane is physically installed.

DESCRIPTION OF SYSTEM OPERATION

With reference to FIGS. 1 through **2*c*, the operation of the terminal system 100 incorporating the present invention will now be described. In accordance with the present invention, a diagnostic routine can be initiated either in response to an error condition or as part of an initialization routine for determining the amount of continguous memory present. For example, as part of the initialization routine, after all of the internal register operations have been verified as operating properly, the control store 120-2 is operative to generate a subcommand signal which forces the contents of the A register 106-2 and bit counter 102-8 to 0's. Starting with the lowest memory address (i.e., all 0's), the control store 120-2 initiates reading and writing into the memory storage locations of main memory 102** to check main memory addressing and that data can be read from and written into each storage location correctly.

The above operation is performed four times. During the first time, an all 0 bit pattern is written into each of the memory locations including nonexistent memory locations. Then the contents of each of the locations is read out and tested for all 0's. During the second time, an all 1 bit pattern is written into each of the locations and then each location is read out and tested for all 1's. Next, the lower half of a memory address is written into each of the locations and then read out from each location and compared with the address written to check for proper addressing. Lastly, the high order half of an address is written into each of the locations and then read out from each location and compared. During the entire testing operation, the parity error checking circuit 102-12 is inhibited from generating an error signal.

After it has been determined that main memory 102 is operating properly, the parity error checking circuits are enabled so that the terminal system 100 can explicitly test to establish the maximum address for the system and store it in a predetermined scratchpad storage location in main memory. That is, during the last test, the control store decode logic circuits 120-12 reset the test flip-flop 102-10 to a binary 0 state prior to each memory cycle of operation. Each time the decode logic circuits 120-12 decode a microinstruction specifying a main memory cycle of operation, they are operative to generate control signals C1RC010, C1WC010 and C1T1M10 in the correct sequence. These signals, as shown in FIG. 1*a* and 13 are applied to the timing circuits of main memory 102-2 so as to cause the addressing of the storage location specified by the contents of the MAR register 102-6. The contents are read out a bit at a time via sense amplifier circuit 400-2 into the bit buffer stage 400-4. The bit contents of stage 400-4 are then shifted into the main memory local register 102-4 of FIG. 1. The same bit is written back into the bit location directly or modified during the write portion of the memory cycle.

When an entire byte has been assembled into register 102-4, the parity check circuits 102-12 compare the parity bit of the byte with the parity bit generated by the parity check circuit 102-12. In the absence of a true comparison, the circuit 102-2 generates a parity error signal.

During each memory cycle, the checking circuits of FIG. 2*a* are operative to return or echo the read command signal C1RC010 back to the test flip-flop 102-10 indicating that the memory plane of the addressed bit storage location is present. The return signal X1MCK00 switches the test flip-flop to its binary 1 state. After each main memory cycle, the microinstruction decode logic circuits 120-12 generate a subcommand signal which initiates testing of the flip-flop's state. When the flip-flop 102-10 is in a binary 0 state, this establishes the maximum size of memory available and the address contained in the A register represents the address of the first nonpresent byte memory location. Also, it signals the maintenance routine to stop checking memory since there are no more memory locations to check.

The control store branch address circuits are conditioned by signal TEST10 to branch to microinstruction routine which loads the contents of the A register 106-2 into the predetermined scratchpad location of main memory 102-2 specified by the address field of one of the microinstructions contained in the routine. Thereafter, the terminal system 100 is returned to normal processing.

During normal processing, the terminal system is able to test the state of the test flip-flop 102-10 in response to a parity error signal. The parity error signal causes the address circuits 120-14 to branch the control store 120-2 to a fixed storage location which corresponds to the start of a maintenance routine is operative to test the state of flip-flop 120-14 in order to determine whether the error had been caused by an attempt to reference a nonexistent or uninstalled memory storage location. In those instances where flip-flop 120-14 has not been switched to a binary ONE by return signal X1MCK00, the control store decode logic circuits 120-12 generate the subcommand signal which samples the state of the parity indicator circuits (not shown) and set a nonexistent memory error indicator (not shown) when there is a parity error and when flip-flop 120-14 is in a binary ZERO state. As mentioned, since the system employs odd parity, the read out of a nonexistent memory location contents automatically produces a parity error.

Additionally, once an address representative of the maximum amount of continguous memory available has been stored in the scratchpad storage location, this address can be referenced by any program subsequently loaded into main memory 102-2 of the terminal system 100. For example, during on-line operations, this address can be referenced by the host data processing unit 105 before it loads a user's program via the communications channel 104. That is, the data processing unit 105 may want to run a sort program which requires a predetermined amount of memory address space in order to run efficiently. Prior to loading the sort program, the data processing unit 105 determines the amount of memory the terminal system 106 has available. This would be accomplished by using conventional communications control procedures in which the adapter 107 is operative in response to a message from the host data processing unit 105 to cause the terminal system program to transmit the maximum address as part of the normal message response. That is, the program would be operative to generate a TRANSFER MAXIMUM ADDRESS subcommand signal which causes the address circuits 120-14 to branch the control store 120-2 to a further microinstruction sequence. This sequence causes the decode logic circuits 120-12 to generate a sequence of signals which cause the A register to be loaded with the address of the scratchpad location, read out of the contents of the scratchpad location to the adapter 107 via register 102-4 and 106-8 for transmission in a conventional manner to the data processing unit 105. It will be obvious that the same operations could be initiated in response to a special command transmitted to the termal system 100 by the data processing unit 105.

In addition to on-line operations, the terminal system 100 can also use the maximum address information in connection with running programs off-line. For example, when a sort program is loaded into main memory 102-2 of the system 100, the system is operative as part of its normal start up procedure to reference the maximum address information in the manner described above. In accordance with the information, the system program then establishes the required number of buffers and sizes of the buffers for that amount of memory.

The preferred embodiment described has illustrated memory presence checking apparatus and various ways of using such checking apparatus in combination with the memory unit of a terminal system. In addition to being able to detect when a program attempts access to a nonexistent or uninstalled memory storage location, the checking apparatus is also used to determine the size of its memory system and store this value in a dedicated scratchpad location within the memory. As described, once this value has been stored, it can be used by the system in connection with both on-line data interchange operations and off-line program load operations. It will be obvious to those skilled in the art that many modifications can be made to the present invention and that the present invention may be incorporated into other systems without departing from the teachings of the invention.

While in accordance with the provisions and statutes, there has been described and illustrated the best form of the invention known, certain changes may be made to the elements described without departing from the spirit of the invention as set forth in the appended claims and that, in some cases, certain features of the invention may be used to advantage without the corresponding use of other features.

Having described the invention, what is claimed as new and novel and for which it is desired to secure Letters Patent is:

1. For use in a data processing system including:

an addressable memory system including a plurality of memory planes, each plane having a plurality of storage locations, address register means for storing address signals designating a plane and a storage location within said plane to be accessed, decoding circuit means coupled to said address register means and individually to each of said planes, said decoding means being operative in response to a command signal from said processing system to initiate a memory cycle of operation by applying said command signal to a designated one of said planes for accessing information stored in one of said plurality of storage locations designated by said address signals, register means coupled to said memory system, said register means for storing said information of a referenced storage location, checking apparatus comprising:

a plurality of logic circuit means, one individually coupled to be associated with each of said plurality of planes, each one being connected to receive a predetermined signal from said associated plane indicating whether said plane is included in said memory system and each one of said logic circuit means being operative to generate an output signal upon the application of said command signal only when conditioned by said predetermined signal during said memory cycle of operation; and, output means being operatively coupled to each of said plurality of logic circuit means and to an output terminal, said output means being operative in response to said output signal from a logic circuit means of a selected plane to return a control signal to said output terminal indicating to said processing system that the storage location accessed during the memory cycle of operation is physically present.

2. In the system according to claim 1 wherein said system further includes:

parity checking means coupled to said register means, said parity check means being operative to perform an odd parity check based upon the contents of said register means and said parity checking means including means for generating an error signal upon the occurrence of a parity error condition; and, control store means coupled to said means, said control store means being operative to generate subcommand signals for directing the system during a cycle of operation and said control store means being conditioned by said error signal to generate subcommand signals for testing said output means to determine whether said parity error condition was caused by referencing during a previous memory cycle of operation a storage location which is not present.

3. In the system of claim 2 wherein said output means includes:

bistable switching means, said bistable switching means being operative in response to said control signal to switch from a first state to a second state and said bistable switching means being coupled to said control store means, said bistable switching means being conditioned by said signals from said control store means to be switched from said second to said first state at the completion of a memory cycle of operation.

4. In the system according to claim 1 wherein said checking apparatus further includes:

a plurality of circuit means, one circuit means being individually associated with each of said plurality of logic circuit means, and each of said plurality of memory planes, each one of circuit means including connector means being connected to a predetermined reference potential when the associated plane is electrically connected to said memory system producing said predetermined signal.

5. In the system according to claim 4 wherein said plurality of logic circuit means each include:

first gating means having first and second input terminals and an output terminal, said first input terminal being connected to receive said control signal from said decoding means; and, second gating means having an input terminal and an output terminal, said input terminal being connected to receive said predetermined signal from an associated one of said circuit means and said output terminal being connected in common with said output terminal of said first gating means; and wherein said checking apparatus includes:

first conductor means for coupling said output terminals of said first and second gating means of the one of said logic circuit means associated with a plane designated by the lowest address to said output means; and second conductor means for coupling the output terminals of said first and second gating means of each one of the remaining logic circuit means to the second input terminal of said first gating means of said logic circuit means associated with a plane designated by the next lowest address, any one of said first gating means being operative in response to said control signal to inhibit a transfer of signals to said output means from any one of the logic circuit means associated with planes designated by addresses higher than the plane designed for access and said first and second gating means of each of the logic circuit means associated with planes designated by addresses lower than said plane designated for access being conditioned by the predetermined signal of an associated plane to apply a signal to said output means only when all of the planes designated by said lower addresses have been signalled by associated circuit means as being connected.

6. The system of claim 5 wherein each of said first gating means of said logic circuit means includes an AND gate.

7. In the system according to claim 4 wherein said plurality of logic circuit means each include:

gating means having first and second input terminals and an output terminal, said first input terminal being connected to receive said control signal from said decoding means; and wherein said checking apparatus further includes:

first conductor means for coupling said output terminal of said gating means of the one of said logic circuit means associated with a plane designated by the lowest address to said output terminal; and second conductor means for coupling the output terminals of said gating means of each one of the remaining logic circuit terminals of the gating means of said logic circuit means associated with a plane designated by the next lowest address, any one of said gating means in response to said control signal being operative to inhibit a transfer of signals to said output means from any one of the logic means associated with planes designated by addresses higher than the plane designated for access and said gating means of the logic circuit means associated with planes designated by addresses lower than said plane designated for access being operative to apply a signal to said output means in response to said control signal only when all of the planes designated by said lower addresses are connected in said memory system.

8. In the system of according to claim 7 wherein said gating means of each of said plurality of logic circuit means includes an AND gate.

9. In the system according to claim 4 wherein said plurality of logic circuits each include:

gating means having an input terminal and an output terminal, said input terminal being connected to receive said control signal from said decoding means and wherein said checking means further includes conductor means connected to the output terminal of each of said gating means in common to said output means, each of said gating means being operative in response to said control signal to apply a signal to said output means only when the associated plane is connected in said memory system.

10. A terminal system comprising:

addressable main memory means having a plurality of memory sections, each section having a plurality of storage locations;

address register means coupled to said main memory means, said register means for storing signals identifying a section and storage location within said section to be referenced during a memory cycle of operation, and said address register means including means for modifying said signals to reference a next sequential storage location in said memory means;

decoding means coupled to said address register means and to each of said memory sections, said decoding means being operative in response to a command control signal from said terminal system to apply said control signal to a designated one of said memory sections for initiating the read out of the contents of a designated storage location during a memory cycle of operation;

register means coupled to said main memory means, said register means for storing the contents of a referenced location;

control signal generating means, said control means being operative to generate subcommand signals for directing said system during a cycle of operation; and, memory checking apparatus comprising:

a plurality of circuit means, one circuit means individually associated with each of said plurality of memory sections, each one being connected to generate a control signal when said associated section is physically connected in said memory means;

a plurality of logic circuit means, one individually associated with each of said plurality of circuit means for receiving a control signal from said one circuit means and each of said plurality of logic circuit means being coupled to said decoding means, said each one logic circuit means being operative in response to said command control signal to generate an output signal only when conditioned by the control signal from said associated circuit means; and, output means coupled to said control means and to each of said plurality of logic circuit means for receiving said output signal;

said control means being operative in response to a first input control signal to generate a sequence of subcommand signals which initiate a series of memory cycles of operation, said address register means being forced to a predetermined state for referencing a first storage location in said memory means, said output means being operative in response to the occurrence of said control signal during each memory cycle to enable said control means condition said address register means to reference a next sequential storage location and said output means being operative upon referencing a first storage location which fails to produce said control signal to condition said control means to force said address register means to another predetermined state for referencing a predetermined storage location in said memory means for storing a signal representation of the address of said first storage location corresponding to the maximum amount of contiguous memory available within said memory means.

11. The system of claim 10 wherein said control means includes means for receiving a second input control signal, said control means being conditioned by said second input control signal to generate subcommand signals for initiating another memory cycle of operation, said address register means being forced to said another predetermined state for referencing said predetermined storage location for read out of said signal representations corresponding to said maximum address into said register means.

12. The system of claim 10 wherein said plurality of circuit means, each includes connector means coupled to said associated memory section, each connector means being connected to a predetermined reference potential when said associated memory section is electrically connected into said memory means.

13. The system of claim 12 wherein each said connector means includes a pin connector and said predetermined reference potential corresponds to a ground potential.

14. The system of claim 10 wherein said plurality of logic circuit means each include:

first gating means having first and second terminals and an output terminal, said first input terminal being connected to receive said control signal from said decoding means; and, second gating means having an input terminal and an output terminal, said input terminal being connected to receive said predetermined signal from an associated one of said circuit means and said output terminal being connected in common with said output terminal of said first gating means; and wherein said checking apparatus further includes:

first conductor means for coupling said output terminals of said first and second gating means of the one of said logic circuit means associated with a plane designated by the lowest address to said output means; and second conductor means for coupling the output terminals of said first and second gating means of each one of the remaining logic circuit means to the second input terminal of said first gating means of said logic circuit means associated with a plane designated by the next lowest address, any one of said first gating means being operative in response to said control signal to inhibit a transfer of signals to said output means from any one of the logic circuit means associated with planes designated by addresses higher than the plane designed for access and said first and second gating means of each of the logic circuit means associated with planes designated by addresses lower than said plane designated for access being conditioned by the predetermined signal of an associated plane to apply a signal to said output means only when all of the planes designated by said lower addresses have been signalled by associated circuit means as being connected.

15. The system of claim 14 wherein each of said first gating means of said logic circuit means includes an AND gate.

16. The system of claim 10 wherein said plurality of logic circuit means each include:

gating means having first and second input terminals and an output terminal, said first input terminal being connected to receive said control signal from said decoding means; and wherein said checking apparatus further includes:

first conductor means for coupling said output terminal of said gating means of the one of said logic circuit means associated with a plane designated by the lowest address to said output terminal; and second conductor means for coupling the output terminals of said gating means of each one of the remaining logic circuit terminal of the gating means of said logic circuit means associated with a plane designated by the next lowest address, any one of said gating means in response to said control signal being operative to inhibit a transfer of signals to said output means from any one of the logic means associated with planes designated by addresses higher than the plane designated for access and said gating means of the logic circuit means associated with planes designated by addresses lower than said plane designated for access being operative to apply a signal to said output means in response to said control signal only when all of the planes designated by said lower addresses are connected in said memory system.

17. The system of claim 16 wherein said gating means of each of said plurality of logic circuit means includes an AND gate.

18. The system of claim 10 wherein said plurality of logic circuits each include:

gating means having an input terminal and an output terminal, said input terminal being connected to receive said control signal from said decoding means and wherein said checking means further includes conductor means connected to the output terminal of each of said gating means in common to said output means, each of said gating means being operative in response to said control signal to apply a signal to said output means only when the associated plane is connected in said memory system.

19. The system of claim 10 wherein said system further includes:

data transfer means coupled to said register means, said transfer means being conditioned by said control means to transfer said signal representation to a remote source.

20. In a data processing system including:

an addressable memory means including a plurality of installable memory sections, said plurality of sections being arranged to form a contiguous addressable memory space when installed in said memory means, each section having a plurality of storage locations and means coupled to apply select signals during a memory cycle of operation to an addressed one of said plurality of sections for accessing information stored in one of said plurality of storage locations;

register means coupled to said memory means for storing the information of a referenced storage location, said system further including checking apparatus comprising:

a plurality of circuit means, one individually associated with each of said plurality of sections, each one of said circuit means being operative to generate a predetermined signal level when the associated section is connected in said memory means;

a plurality of logic circuit means, one individually associated with each of said plurality of circuit means for receiving a predetermined signal level from a corresponding one of said logic circuit means, each of said logic circuit means being coupled to said means for receiving a predetermined one of said signals designating when the associated section has been selected for access; and, output means being operatively coupled to each of said plurality of logic circuit means, each of said logic circuit means being operative in response to said select signals when conditioned by said predetermined signal level to condition said output means to generate a return control signal for indicating to said system that the storage location accessed during the memory cycle of operation is installed.

21. The system of claim 20 wherein said system further includes:

parity checking means coupled to said register means, said parity check means being operative to perform a parity check operation upon the contents of said register means and said parity check means including means for generating an error signal upon the occurrence of a parity error condition;

cycled addressable control store means, said control store means including a plurality of storage locations for storing microinstruction words of a plurality of microprogram routines;

decoding means coupled to said control store means for generating a plurality of subcommand signals in response to each microinstruction word referenced during a cycle of operation;

bistable storage means coupled to said output means and to said decoding means, said bistable means being operative in response to said return control signal to switch from a first state to a second state, said control store means being conditioned by said error signal to reference a predetermined one of said plurality of microprogram routines and said decoding means being operative in response to the microinstruction words of said routine to generate subcommand signals for testing the state of said bistable storage means and for generating a signal indicating that said error was caused by addressing an uninstalled storage location when said bistable means has not been switched to said second state.

22. The system of claim 20 wherein said system further includes:

address register means coupled to said means of said memory means, said address register means for storing signals identifying a section and storage location within said section to be accessed during a memory cycle of operation;

cycled addressable control store means, said control store means including a plurality of storage locations for storing microinstruction words of a plurality of microprogram routines;

decoding means coupled to said control store means for generating a plurality of subcommand signals in response to each microinstruction word referenced during a cycle of operation; and, bistable storage means coupled to said output means and to said decoding means, said bistable means being operative in response to said return control signal to switch from a first state to a second state and said bistable means being conditioned by a predetermined one of said plurality of subcommand signals to be switched from said second state to said first state;

said control store means being operative in response to a first control signal to reference a predetermined one of said plurality of microprogram routines and said decoding means being operative in response to the microinstruction words of said routine to generate subcommand signals for conditioning said address register means for addressing in sequence storage locations of said memory means starting from an initial address during successive memory cycles of operation, and switching said bistable means from said second to said first state, said control store means being conditioned by the state of said bistable means upon addressing a storage location which did not switch said bistable means to said second state to cause said address register means to reference a predetermined storage location in said memory means for storing a signal representation of the address of said storage location to identify the maximum amount of continguous memory storage locations within said memory means.

23. The system of claim 22 wherein said control store means includes means for receiving a second control signal, said control store means being conditioned by said second signal to reference another predetermined one of said plurality of microprogram routines, said decoding means being operative in response to the microinstruction words of said routine to generate subcommand signals for conditioning said address register means to reference said predetermined storage location for read out of said signal representations corresponding to a maximum address to said register means.

24. The system of claim 22 wherein said predetermined one of said microprogram routines is included as part of an initialization microprogram routine stored in said control store means, and wherein said control store means includes means for receiving an initialization control signal, said control store means being conditioned by said control signal to reference said routine and said decoding means being operative in response to the microinstruction words of said routine to generate subcommand signals for testing the operation of said memory means before referencing said predetermined one of said routines.

25. The system of claim 20 wherein said means of said memory means includes:

a plurality of gating means, one individually associated with a pair of said plurality of logic circuit means, each of said plurality of gating means including:

first gating means for receiving a read command signal;

second gating means coupled to said first gating means and connected to receive a plurality of address signals coded to designate either one of pair of said plurality of memory sections; and first and second output gating means, each being coupled to said second gating means and connected to receive another address signal;

one of said first and second output gating means of each of said plurality of gating means being operative in response to said read command signal to apply a selection signal to the associated one of the pair of said plurality of logic circuit means only when all of said address signals are coded to select the section associated with said logic circuit means.

26. The system of claim 25 wherein each of said first and second output gating means of each of said plurality of gating means includes a NAND gate.

27. The system of claim 26 wherein said plurality of logic circuit means, each include:

first gating means having first and second input terminals and an output terminal, said first input terminal being connected to receive said control signal from said decoding means; and, second gating means having an input terminal and an output terminal, said input terminal being connected to receive said predetermined signal from an associated one of said circuit means and said output terminal being connected in common with said output terminal of said first gating means; and, wherein said checking apparatus further includes:

first conductor means for coupling said output terminals of said first and second gating means of the one of said logic circuit means associated with a plane designated by the lowest address to said output means; and second conductor means for coupling the output terminals of said first and second gating means of each one of the remaining logic circuit means to the second input terminal of said first gating means of said logic circuit means associated with a plane designated by the next lowest address, any one of said first gating means being operative in response to said control signal to inhibit a transfer of signals to said output means from any one of the logic circuit means associated with planes designated by addresses higher than the plane designed for access and said first and second gating means of each of the logic circuit means associated with planes designated by addresses lower than said plane designated for access being conditioned by the predetermined signal of an associated plane to apply a signal to said output means only when all of the planes designated by said lower addresses have been signalled by associated circuit means as being connected.

* * * * *